United States Patent [19]

Uchiyama et al.

[11] 3,884,987

[45] May 20, 1975

[54] PRODUCTION OF DEALKYLATED AROMATIC HYDROCARBONS AND HYDROGEN

[75] Inventors: Masao Uchiyama; Shoichiro Mori, both of Ibaraki, Japan

[73] Assignee: Mitsubishi Petrochemical Company Limited, Tokyo, Japan

[22] Filed: Dec. 1, 1972

[21] Appl. No.: 311,431

[30] Foreign Application Priority Data
Dec. 29, 1971 Japan.................................. 47-3448

[52] U.S. Cl............................................. 260/672 R
[51] Int. Cl............................................. C07c 3/58
[58] Field of Search.................. 260/672 R; 208/135

[56] References Cited
UNITED STATES PATENTS
3,291,850  12/1966  Carson............................ 260/672 R
3,436,433  4/1969  Lester............................. 260/672 R
3,436,434  4/1969  Lester............................. 260/672 R
3,442,793  5/1969  Carson............................ 260/672 R
3,695,932  7/1971  Maslyansky et al............. 260/672 R

*Primary Examiner*—C. Davis
*Attorney, Agent, or Firm*—Wenderoth, Lind & Ponack

[57] ABSTRACT

A process for producing dealkylated aromatic hydrocarbons and hydrogen from a hydrocarbon oil comprises the steps of subjecting to catalytic steam dealkylation a hydrocarbon oil containing at least 50% by weight of an alkylaromatic hydrocarbon and having an initial boiling point higher than that of the dealkylated aromatic hydrocarbon to be produced by at least 5°C and recovering the dealkylated aromatic hydrocarbon thus produced and hydrogen of high purity from the resulting products.

18 Claims, No Drawings

PRODUCTION OF DEALKYLATED AROMATIC HYDROCARBONS AND HYDROGEN

BACKGROUND OF THE INVENTION

This invention relates to the production of dealkylated aromatic hydrocarbons and hydrogen, and more particularly to a process therefor wherein a hydrocarbon oil containing a significant percentage of alkylaromatics and having a boiling point in a specific range in subjected to catalytic steam dealkylation, and dealkylated aromatic hydrocarbons and hydrogen of high purity are recovered simultaneously from the resulting products.

Heretofore, it has been considered that in a steam reforming process for producing hydrogen from naphtha, hydrocarbons containing larger amounts of aromatics are not suitable as starting materials for such a process, because such materials would have low gasifying velocities (two references being Japanese Pat. publication Nos. 7252/1967 and 3006/1967). For this reason, the aromatic hydrocarbon content in the starting hydrocarbon oil, for producing hydrogen from naphtha by the steam reforming process, has been specified at values less than 5%.

On the other hand, known is a dealkylation process wherein an alkylaromatic hydrocarbon is subjected to catalytic steam dealkylation, thereby obtaining an alkylaromatic hydrocarbon having a side chain having a number of carbon reduced by at least one from that of the original alkylaromatic hydrocarbon. In this reaction, a typical catalyst comprises nickel, rhenium, rhodium, or a mixture thereof supported by a refractory oxide such as alumina, chromia, magnesia, silica, beryllia, or a mixture thereof. Reference is made to: A.A. Balandin et al., *Repr. Proc. 7th World Petrol. Congress* (*Mexico*) vol. VIII, 121-133 (1967) for Ni—Cr$_2$O$_3$, Ni—Al$_2$O$_3$ catalysts; Y. Ogino et al., *Bull. Japan. Petrol. Inst.* vol. 12 112 (1970) for Ni-Alkaline earth metal catalysts; I. A. Slorokhotova, *Neftekhimiya* vol. 11,842 (1971), G. N. Maslyanskii et al., *Kinetika i Kataliz*, vol. 12.(6) 1567–1569 (1971) and G. N. Maslyanskii et al., *Neftekhimiya* vol. 12, 195 (1972) for Rh catalysts.

If the reaction condition and the type of the catalyst are selected suitably, only the side-chain part of the alkylaromatic hydrocarbon can be selectively decomposed into CO$_2$, CO, and hydrogen gases, without breaking the aromatic nucleus.

According to our study, it has been found that the above described steam dealkylation for the alkylaromatic hydrocarbon can otherwise be used for dealkylating a mixture of alkylaromatic hydrocarbons and a considerable quantity of paraffins or naphthenes. In other words, when a mixture of alkylaromatic hydrocarbons and paraffins or naphthenes is subjected to catalytic steam dealkylation, degradation takes place in the side chains of the alkylaromatic hydrocarbons and aliphatic chains of the paraffins or naphthenes and CO$_2$, CO, and H$_2$ gases are generated.

Furthermore, as a result of the dealkylation process, a mere trace of lower hydrocarbons are produced other than aromatic hydrocarbons. Moreover, production of naphthenes and paraffins due to hydrogenation of the aromatic nucleus is not observed. However, in some cases where certain types of catalysts are employed in the reaction, methane is produced by a side reaction between CO$_2$ or CO and H$_2$.

The products, obtained through the steam dealkylation reaction of a mixture of alkylaromatic hydrocarbons containing considerable amounts of paraffins and naphthenes, comprise essentially dealkylated aromatic hydrocarbons and gases such as CO$_2$, CO, or H$_2$ (and sometimes methane). Therefore, the dealkylated aromatic hydrocarbons, constituting the objective products of such reaction, can be separated from the remaining substances through a simple procedure such as distillation. In addition, the hydrogen H$_2$ may also be easily separated and recovered from the gaseous products.

For the above stated reasons, the aforementioned steam dealkylation process may also be employed as a process for producing high purity dealkylated aromatic hydrocarbons and hydrogen from a starting material as described above.

SUMMARY OF THE INVENTION

A primary object of the present invention is to provide a process for producing dealkylated aromatic hydrocarbons and hydrogen by a catalytic steam dealkylation procedure.

Another object of the invention is to provide a process, as stated above, which is made practicable by imposing a limitation on the composition of the starting hydrocarbon mixture.

These and other objects of the present invention can be achieved by a process for producing dealkylated aromatic hydrocarbons and hydrogen, which comprises the steps of subjecting a hydrocarbon oil containing at least 50% by weight of alkylaromatic hydrocarbons and having an initial boiling point higher than that of the dealkylated aromatic hydrocarbons to be produced by at least 5°C to catalytic steam dealkylation and recovering the dealkylated aromatic hydrocarbons thus produced and hydrogen from the resulting products.

According to a preferred embodiment of the present invention, benzene and hydrogen of high purity can be produced simultaneously. That is, gasoline obtained by thermal cracking and having the boiling points ranging from 90° to 150°C (containing about 75% by weight of methyl-substituted benzenes) is passed over a suitable catalyst in the presence of steam, whereby the methyl-subsituted benzenes contained in the starting material is demethylated, as follows, thereby to produce benzene.

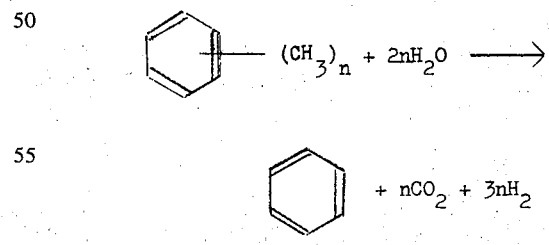

If the demethylating condition is somewhat milder, lower demethylated benzenes, such as toluene, will be produced as by-products. Paraffins and naphthenes contained in the mixture react with steam to produce CO$_2$ and H$_2$. Furthermore, the production of lower hydrocarbons (paraffins or naphthene having boiling points lower than 90°C) except methane is of the order of a mere trace. Thus, pure benzene, having a boiling point of 80.1°C, can be obtained from the liquid phase of the products by simple distillation.

The gaseous products obtained through the above described procedure contain hydrogen in a quantity of about 60–80% by volume, and the remainder of the parts are substantially $CO_2$ and CO. Thus, hydrogen of high purity can be produced by a well known hydrogen purification procedure.

DETAILED DESCRIPTION OF THE INVENTION

1. Starting Hydrocarbon

The starting hydrocarbon mixture is so selected that it contains at least 50% by weight, preferably at least 70% by weight, of alkylaromatic hydrocarbons, and that the initial boiling point of the starting hydrocarbon mixture is at least about 5°C, preferably 10°C, higher than that of the dealkylated aromatic hydrocarbon to be produced.

Since the amounts of paraffins and naphthenes contained in the aromatics produced cannot be neglected, when the contents of these substances in the starting hydrocarbon mixture increase, the initial contents of these substances in the starting hydrocarbon mixture must be restricted when the production of pure aromatic hydrocarbons is required.

Generally speaking, the contents of paraffins and naphthenes in the starting hydrocarbons are limited to less than 50% by weight, or preferably less than 30% by weight.

More practically, catalytic reformate, gasoline range fractions obtained by thermal cracking of petroleum, fractions contained in coal tar naphtha, or most mixtures thereof may be used as a starting oil for this process.

The contents of components contained in the starting oil as its impurities and tending to constitute catalyst poisons, such as sulfur compounds or the like, must be minimized to less than predetermined level, and conventionally known practices can be employed for this purpose.

2. Catalyst

The catalysts to be used in this invention may be of any type which can be used in the steam dealkylation reaction, and Ni-based or rhodium-based catalysts are generally used therein. In the selection of the catalyst, use of those accelerating the methanizing reaction between $CO_2$ or CO and $H_2$ must be avoided because of the possibility of complicating the purification of hydrogen. Furthermore, since the methane forming reaction is influenced by other reaction conditions, such conditions must be selected carefully.

Specific examples of the catalyst are as follows.

Ni-based catalysta disclosed in our Japanese patent application Nos. 105709/1970, 105710/1970; rhodium-based catalysts disclosed in U.S. Pat. No. 3,436,433 and British Pat. No. 1,174,819; and rhenium-based catalysts disclosed in the Japanese Pat. publication No. 27282/1969.

3. Reaction Conditions

1. Temperature

While in this catalytic steam dealkylation reaction, the reaction rate increases with elevation of the temperature, the retention of the aromatic nucleuses decreases with the elevation of the reaction temperature. Accordingly, when an increased production of hydrogen as a result of increasing the per-pass yield is desired, a temperature higher than 450°C is preferable. However, when a high yield of aromatic hydrocarbon is desired, a temperature in a range of from 350° to 475°C is preferred. Thus, the temperature of the catalytic reaction will generally be in a range of from 350° to 600°C, preferably from 370° to 500°C.

2. Pressure

As pressure increases, the yield of hydrogen will be decreased as a result of the conversions of CO and $CO_2$ into $CH_4$, and the separation of hydrogen from the remainder of the gases will be complicated because of the production of the methane. With consideration of these points, the reaction pressure is selected in a range starting from atmospheric pressure to 50Kg/cm²G, or more, preferably from 0 to 30 Kg/cm²G.

3. Mole Ratio of Steam to Feed Oil

This ratio differs with the aromatic concentration in the feed oil. When the aromatic concentration in the feed oil is low, a greater quantity of steam must be added. Accordingly, the mole ratio of steam to starting oil is selected at a level less than 20, or in a range of from 0.5 to 10.0.

4. Reactor

The dealkylation reaction is highly endothermic. For instance, in the case of the following typical reaction for obtaining benzene from a $C_9$ aromatic hydrocarbon, endothermicity is about 96 kcal/mole at 700°K.

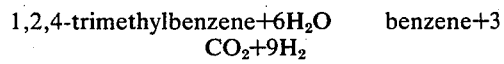
1,2,4-trimethylbenzene+6H₂O   benzene+3 CO₂+9H₂

Furthermore, in the case wherein the $C_9$ aromatic hydrocarbons are completely gasified as indicated in the following formula, approximately 220 Kcal/mole is absorbed.

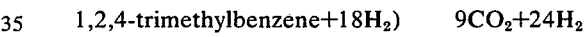
1,2,4-trimethylbenzene+18H₂)   9CO₂+24H₂

For supplying the above indicated reaction heat, the reactor may be one of various types such as an externally-heated multi-tube reactor, an adiabatic reactor consisting of unit reactors connected in series provided with an intermediate heater, or a fluidized bed reactor.

5. Product Separation and Purification

The gas product obtained from the reaction contains hydrogen and $CO_2$ as its major components, and methane, CO, and other hydrocarbons of more than $C_2$ as its minor components. On the other hand, the liquid product obtained from the dealkylation reaction comprises hydrocarbons including benzene as a component having the lowest boiling point. Both the gas product and liquid product can be easily separated into their components. Accordingly, hydrogen of high purity can be obtained from the gaseous product by the application of a conventional hydrogen purification process after the gas product is subjected to gas-liquid separation and then to a process for removing liquid hydrocarbons saturated in the gaseous products.

As to the liquid products, the dealkylated hydrocarbons can be easily separated from the remainder of components, for instance, by distillation, because the boiling points of the remainder of the components are all higher than those of the dealkylated hydrocarbons by at least about 10°C.

It should be noted that the term "dealkylated aromatic hydrocarbons" herein used is defined as designating hydrocarbons obtained by removing at least one alkyl group from the alkylaromatic hydrocarbon constituting the starting material.

6. Examples of Practice

The invention will be more clearly understood from the following examples.

EXAMPLE 1

A basic nickel carbonate slurry (200g)(wet basis), an aqueous solution of thorium nitrate (12g), an aqueous solution of thallium nitrate (0.65 g), and an aqueous solution of potassium carbonate (2.4g) were thoroughly mixed with 50g of alumina, and the resulting mixture was dried at 110°C for 3 hours. The alumina employed had been prepared by dropping aqueous ammonia into an aqueous solution of aluminum nitrate, washing with water the aluminum hydroxide obtained, drying at 110°C, and calcining at 350°C for 5 hours.

The catalytic composite thus dried was heated at 350°C for 3 hours to decompose the salts and then calcined at 550°C for 3 hours. About 50 c.c. of the catalyst was placed in a fixed bed tubular reactor and then was reduced in the stream of hydrogen at 450°C for 2 hours.

Thereafter, toluene and steam were charged to the reactor at a temperature of 400°C, the mole ratio of steam to toluene being maintained at 6/1, and a toluene liquid hourly space velocity (LHSV) being maintained at 1. After about 50 hours toluene was replalced by thermally-cracked gasoline. Results at various temperature levels are shown below.

1. Starting material:
   Feed oil was a 90°–150°C fraction of the hydrodesulfurized thermally cracked gasoline. Composition of the starting material (% by weight) was as follows.

| | |
   |---|---|
   | Aromatic hydrocarbons | 77.2% |
   | benzene | 0.0 |
   | toluene | 42.6 |
   | $C_8$ aromatics | 31.6 |
   | Nonaromatic hydrocarbons | 25.8 |

2. Reaction conditions:

| | Run 1 | Run 2 |
   |---|---|---|
   | Temperature (°C) | 450 | 500 |
   | LHSV | 1.0 | 1.0 |
   | Steam/material ratio (both in liquid state) | 1.0 | 1.0 |

3. Results of the reaction:

| | Run 1 | Run 2 |
   |---|---|---|
   | Liquid yield (% by weight) | 80.1 | 63.8 |
   | Conversion of toluene and xylene (mole %) | 44.8 | 61.6 |
   | Conversion of non-aromatics (% by weight) | 14.2 | 33.4 |
   | Composition of the liquid product (% by weight): | | |
   | benzene | 22.8 | 30.0 |
   | toluene | 37.0 | 33.8 |
   | $C_8$ aromatics | 12.9 | 9.6 |
   | nonaromatics | 27.3 | 26.6 |
   | Gas generation rate (Nl/hour) | 39.6 | 80.3 |
   | Composition of the gaseous product (% by volume): | | |
   | $H_2$ | 77.5 | 73.1 |
   | CO | 1.0 | 9.4 |
   | $CO_2$ | 21.5 | 17.5 |
   | $CH_4$ | trace | trace |

The purity of benzene separated from the oil thus produced through distillation was more than 99.9% by weight.

EXAMPLE 2

Extrusion molded gamma-alumina (of 1.5 mm diameter) was immersed for 20 hours in an aqueous solution of a mixture of rhodium chloride and uranyl nitrate. After removing the solution by filteration, obtained catalyst composite was dried at 100°C for 20 hours. The solid mass was calcined at 150°C for 1 hour and then at 450°C for another hour. The catalyst thus obtained had a composition of 0.3% by weight of Rh and 0.5% by weight of $UO_3$.

Ten c.c. of the catalyst was introduced into a stainless reactor tube of an inner diameter 25 mm and was reduced in a stream of hydrogen at 450°C for 2 hours. After the reduction, steam was passed through the tube for 30 min., and the steam dealkylation reaction was caused therein. Reaction conditions were as follows: temperatures: 420° and 450°C; LHSV: 0.6 l/hr. with respect to the starting material; and a liquid volume ratio of steam to starting material: 1. The starting material was a 90°–150°C fraction of the hydrodesulfurized thermally cracked gasoline. The cracking conditions was severer than in the Example 1. The composition of the starting material was shown in the following table.

| | Starting oil | Oil produced by reaction Reaction at 420°C | Oil produced by reaction Reaction at 450°C |
|---|---|---|---|
| Liquid composition (% by weight) | | | |
| benzene | — | 32.72 | 55.57 |
| toluene | 51.59 | 49.29 | 36.58 |
| xylenes | 44.88 | 15.41 | 5.97 |
| nonaromatics | 3.53 | 2.58 | 1.88 |
| Liquid yield (% by weight) | | 72.8 | 49.2 |
| Gas generation (Nl/hour) | | 8.32 | 13.17 |
| Gas product composition (% by volume) | | | |
| $H_2$ | | 71.0 | 65.6 |
| $CO_2$ | | 22.5 | 20.5 |
| CO | | 3.3 | 6.0 |
| $CH_4$ | | 3.2 | 7.9 |

When the benzene fraction in the liquid product was separated by distillation, the purity of the benzene was found to be more than 99.95% by weight.

EXAMPLE 3

10 g of the same catalyst as in Example 2 was employed, and steam dealkylation of a starting material having a compositions as shown in the following table was carried out. The reaction temperature was 420°C, LHSV with respect to the starting material was 0.68/hour, and the volumetric supply ratio of water to the starting material was 1.0.

| | Starting oil | Reaction product |
|---|---|---|
| Liquid composition (% by weight) | | |
| benzene | — | 49.86 |
| n-heptane | 14.06 | 13.52 |
| isooctane | 14.24 | 3.91 |
| methylcyclohexene | 1.74 | 3.81 |
| toluene | 55.96 | 27.83 |
| Liquid yield (% by weight) | | 58.0 |
| gas generation (Nl/hour) | | 1.99 |
| Gas composition (% by volume) | | |
| $H_2$ | | 66.3 |
| $CO_2$ | | 23.9 |
| CO | | 4.0 |
| $CH_4$ | | 5.8 |

Besides the substances indicated in the Table, traces of degraded paraffins, naphthenes, and $C_8$ aromatic hydrocarbons were detected. the purity of benzene distilled from the liquid product was higher than 99.5% by weight.

EXAMPLE 4

Fourty c.c. of catalyst containing $0.3Rh-0.5UO_3-100Al_2O_3$, as described in Example 2 was employed, and a starting material consisting of a toluene fraction and a xylene fraction of thermally cracked gasoline was subjected to a steam dealkylation reaction under the reaction conditions of a reaction temperature of 450°C, a reaction pressure of 12 $Kg/cm^2G$, LHSV of the starting oil of approx. 1.0/hour, and a volumetric supply ratio of water to the starting oil of 1. The result of the reaction was as shown in the following Table.

|  | $C_7$ fraction starting material | | $C_8$ fraction starting material | |
| --- | --- | --- | --- | --- |
|  | feed oil | product oil | feed oil | product oil |
| Liquid product composition (% by weight) | | | | |
| nonaromatics(lower than $C_6$) | — | 0.50 | — | 0.28 |
| nonaromatics(higher than $C_7$) | 9.08 | 1.63 | 3.38 | 0.60 |
| benzene | 0.12 | 55.95 | 0.93 | 27.22 |
| toluene | 90.64 | 40.50 | 1.60 | 43.25 |
| $C_8$ aromatics | 0.16 | 1.42 | 93.30 | 28.64 |
| $C_9$ aromatics | — | — | 0.79 | trace |
| Hydrocarbon oil yield (% by weight) | | 78.3 | | 79.2 |
| Gas generation (Nl/hour) | | 20.92 | | 19.51 |
| Gas product composition (% by volume) | | | | |
| $H_2$ | | 54.9 | | 41.6 |
| $CO_2$ | | 24.8 | | 24.4 |
| $CO$ | | 0.3 | | 0.8 |
| $CH_4$ | | 20.0 | | 33.2 |

In this manner, benzene and toluene with purity of more than 99.9% by weight were obtained from the $C_7$ fraction and $C_8$ fraction of the dealkylated product, respectively, when the dealkylated product obtained by the steam dealkylation of the feed oil is distilled and purified by means of ordinary techniques.

We claim:

1. A process for producing dealkylated aromatic hydrocarbons and hydrogen by steam dealkylation of alkylaromatic hydrocarbons which comprises subjecting a hydrocarbon oil to catalytic steam dealkylation at a reaction temperature of from 350° to 600°C and at a pressure ranging from atmospheric pressure to 50 $kg/cm^2.G$ in the presence of a nickel-based catalyst containing a catalytic amount of nickel and a catalytically effective amount of thorium, said hydrocarbon oil containing at least 50% by weight of an alkylaromatic hydrocarbon and the remainder consisting essentially of non-aromatic hydrocarbons and having an initial boiling point higher than that of the dealkylated aromatic hydrocarbon to be produced by at least 5°C, the mole ratio of steam to the hydrocarbon oil during the steam dealkylation being less than 20 and recovering the dealkylated aromatic hydrocarbon and hydrogen from the resulting products.

2. A process as defined in claim 1 wherein paraffin and naphthene content in said starting hydrocarbon oil is less than 50% by weight.

3. A process as defined in claim 1 wherein said starting hydrocarbon oil is a product obtained by catalytic reforming of a petroleum product.

4. A process as defined in claim 1 wherein said starting hydrocarbon oil is a gasoline fraction obtained by thermal cracking of a petroleum product.

5. A process as defined in claim 1 wherein said starting hydrocarbon oil contains toluene as the alkylaromatic hydrocarbon, and benzene is obtained as the dealkylated aromatic hydrocarbon.

6. A process as defined in claim 1 wherein said starting hydrocarbon oil contains a member selected from the group consisting of xylenes, ethylbezene, and $C_9$-alkylaromatics as the alkylaromatic hydrocarbon, and at least one member selected from the group consisting of benzene and toluene is obtained as the dealkylated aromatic hydro-carbon.

7. A process according to claim 1 wherein the reaction temperature is from 370° to 500°C.

8. A process according to claim 1 where the pressure range is between atmospheric pressure and 30 $Kg/cm^2.G$.

9. A process according to claim 1 where the mole ratio of steam to the hydrocarbon oil is between 0.5 to 10.0.

10. A process for producing dealkylated aromatic hydrocarbons and hydrogen by steam dealkylation of alkylaromatic hydrocarbons which comprises subjecting a hydrocarbon oil to catalytic steam dealkylation at a reaction temperature of from 350° to 600°C and at a pressure ranging from atmospheric pressure to 50 $kg/cm^2.G$ in the presence of a rhodium-based catalyst containing a catalytic amount of rhodium and a catalytically effective amount of uranium, said hydrocarbon oil containing at least 50% by weight of an alkylaromatic hydrocarbon and the remainder consisting essentially of non-aromatic hydrocarbons and having an initial boiling point higher than that of the dealkylated aromatic hydrocarbon to be produced by at least 5°C, the mole ratio of steam to the hydrocarbon oil during the steam dealkylation being less than 20 and recovering the dealkylated aromatic hydrocarbon and hydrogen from the resulting products.

11. A process as defined in claim 10 wherein paraffin and naphthene are present in said starting hydrocarbon oil in amounts less than 50% by weight.

12. A process as defined in claim 10 wherein said starting hydrocarbon oil is a product obtained by catalytic reforming of a petroleum product.

13. A process as defined in claim 10 wherein said starting hydrocarbon oil is a gasoline fraction obtained by thermal cracking of a petroleum product.

14. A process as defined in claim 10 wherein said starting hydrocarbon oil contains toluene as the alkylaromatic hydrocarbon, and benzene is obtained as the dealkylated aromatic hydrocarbon.

15. A process as defined in claim 10 wherein said starting hydrocarbon oil contains a member selected from the group consisting of xylenes, ethylbenzene, and $C_9$-alkylaromatics as the alkylaromatic hydrocarbon, and at least one member selected from the group consisting of benzene and toluene is obtained as the dealkylated aromatic hydrocarbon.

16. A process according to claim 10 wherein the reaction temperature is from 370° to 500°C.

17. A process according to claim 10 where the pressure range is between atmospheric pressure and 30 kg/cm².G.

18. A process according to claim 10 where the mole ratio of steam to the hydrocarbon oil is between 0.5 to 10.0.

* * * * *